(12) United States Patent
Biliavskyi

(10) Patent No.: US 12,566,093 B2
(45) Date of Patent: Mar. 3, 2026

(54) METHOD FOR DETECTING AN OBJECT MOTION

(71) Applicant: AJAX SYSTEMS CYPRUS HOLDINGS LTD, Nicosia (CY)

(72) Inventor: Oleksii Yulianovych Biliavskyi, Novograd-Volynskyi (UA)

(73) Assignee: AJAX SYSTEMS CYPRUS HOLDINGS LTD, Nicosia (CY)

( * ) Notice: Subject to any disclaimer, the term of this patent is extended or adjusted under 35 U.S.C. 154(b) by 721 days.

(21) Appl. No.: 17/818,501

(22) Filed: Aug. 9, 2022

(65) Prior Publication Data

US 2023/0213391 A1 Jul. 6, 2023

(30) Foreign Application Priority Data

Dec. 29, 2021 (UA) ............................... a 2021 07772

(51) Int. Cl.
*G01J 5/34* (2022.01)
*G08B 13/191* (2006.01)
(52) U.S. Cl.
CPC .............. *G01J 5/34* (2013.01); *G08B 13/191* (2013.01)

(58) Field of Classification Search
CPC ................................. G01J 5/34; G08B 13/191
See application file for complete search history.

(56) References Cited

U.S. PATENT DOCUMENTS

| | | | |
|---|---|---|---|
| 6,215,399 B1 * | 4/2001 | Shpater | G08B 29/183 |
| | | | 340/567 |
| 8,039,799 B2 * | 10/2011 | Buckley | G01J 5/064 |
| | | | 250/338.3 |
| 2020/0111335 A1 | 4/2020 | Gagnon et al. | |
| 2021/0080482 A1 | 3/2021 | Cieloch et al. | |

FOREIGN PATENT DOCUMENTS

EP 1544823 B1 7/2007

* cited by examiner

*Primary Examiner* — John E Breene
*Assistant Examiner* — Manuel Salvador Castellon, Jr.
(74) *Attorney, Agent, or Firm* — Saliwanchik, Lloyd & Eisenschenk

(57) ABSTRACT

The invention relates to security methods, while protecting against false activations, and it relates to a method for detecting a motion of objects that utilizes a passive infrared sensor. The invention may be used for security alarm systems. A method for detecting an object motion is proposed, the method comprising: detecting a motion within sensitivity areas of at least two pyrosensors and generating a signal from said pyrosensors.

3 Claims, 10 Drawing Sheets fd(y,t)

METHOD FOR DETECTING AN OBJECT MOTION

CROSS-REFERENCE TO RELATED APPLICATION

This application claims priority to Ukrainian Application No. a 2021 07772, filed Dec. 29, 2021, which is hereby incorporated by reference in its entirety.

FIELD OF THE INVENTION

The invention relates to security methods, while protecting against false activations, and it relates to a method for detecting a motion of objects that utilizes a passive infrared sensor. The invention may be used for security alarm systems.

TERMS USED IN THE DESCRIPTION

False activation is an erroneous alarm signal.

Sensitivity range is an active range that defines an adjustable detection range.

Signal intensity is a signal change rate.

Function is a rule that assigns a member from a plurality being a range of values to each member from a first plurality being a definition range.

Derivative is a differential calculation term that characterizes the function change rate.

Threshold is a limiting value of a parameter that cannot be exceeded during a normal use.

Reference value is a certain quantitative characteristic value that may serve as a standard for calculations.

Pearson correlation coefficient (designated as "r") is a correlation (linear dependence) index between two variables X and Y that takes values from −1 to +1 inclusively.

Discretization is a transformation of continuous variables functions into discrete variables functions, according to which, initial continuous functions may be recovered at a given accuracy.

PRIOR ART

Manufacturers of security systems constantly face with a problem of protection against false activations within security systems. A street is always in motion: wind moves tree and bush leaves warmed by sun, animals and birds walk through an area, insects sit down on a sensor housing. Variety of flora and fauna creates a wide range of interferences, thereby inhibiting an outdoor motion sensor from accurate recognizing a specific type of the object which may be dangerous, in the most cases it is a human. The same relates to internal sensors, when pets may be present in buildings.

A method and a device for reducing a number of erroneous activations via a colorless light within a motion detection system are known (EP1544823B1 dated 18 Jul. 2007). This method is implemented through the motion detection system comprising a first sensor that is sensitive to infrared light at least in one sensitivity range and generates a first output signal that represents a detected infrared light level. A second sensor that is sensitive to visible light and generates a second output signal that represents a detected visible light level. The second sensor is arranged near the first sensor. A processor that is programmed to generate an alarm signal based on the first and the second output signals. The alarm signal will be generated, when the first and the second conditions are met. The first condition will be met, when the first output signal indicates that the motion has occurred in at least one sensitivity area. The second condition will be met, when the second output signal does not correlate to the first output signal.

Said analogue has drawbacks in resolving the posed task, since it discloses the method for reducing the false activations as reactions onto the colorless light specifically, while using different types of the sensors which are sensitive to different radiation spectrum regions. This method does not allow to preselect a certain type of the object which the "alarm" signal will be activated to, and, as a consequence, does not allow to provide an error-free confirmation of the detection of the motion of the specific type of interferences.

A method for motion detection that may be implemented by means of the infrared motion sensor that includes an infrared sensor that is configured to receive the infrared radiation from an area being supervised within the detection field of view and to generate the output waveform signal that indicates time-depending changes of the received infrared radiation in response to the object motion within the detection field of view. In another embodiment, the infrared motion sensor also may comprise a processor that is configured to receive the output waveform signal that is generated by the infrared sensor and to analyze the signal based on the output waveform signal in order to determine whether the motion event has occurred, which may include searching for coincidences between the output waveform signal and one or several reference output waveform signals (US20200111335A1 dated 9 Apr. 2020).

This method is based on comparing to amplitude components that does not allow to provide reliability and accuracy of the signal processing.

A method for verifying a body motion detection using a passive infrared sensor, the method comprising creating a motion data based on a first signal received in a main detection channel, the first signal indicates a possible body motion; generating a verification data based on a second signal or a lack of the second signal received at a secondary detection channel; verifying whether the first signal is the body motion based on the comparison between the motion data and the verification data; wherein the main detection channel is set to receive a first predetermined range of signals, including at least certain infrared signals, while the secondary detection channel is set to receive a second predetermined range of signals, including at least certain infrared signals through an infrared blocker (US2021080482A1 dated 18 Mar. 2021).

This method is based on improving the structure of the sensor that allowed to dismiss false activations caused by interferences, sensor heating, however, did not enable to determine a type of an object being moved precisely and reliably.

TASK OF THE INVENTION

The invention is based on a task to provide a method for detecting an object motion that could allow to divide types of the objects being moved in a rapid and reliable manner in order to isolate the required object, which the "alarm" signal will be activated to, in an error-free manner.

A technical effect being achieved lies in increase of accuracy of determination of the object type in order to reduce a number of false activations of the sensors within security systems due to a several stepwise processing of the signal.

SUMMARY OF THE INVENTION

The posed task is resolved by a proposed method for detecting an object motion, the method comprises:

detecting a motion within sensitivity areas of at least two pyrosensors and generating a signal from said pyrosensors, then, measuring an intensity of the signal by determining a change rate of the signal within a measurement period of 150 ms at most from each pyrosensor, particularly, building a function of the signal change rate at a number of measurements of at least 32 for said measurement period, comparing the measurement data of a derived function curve to thresholds, if the thresholds are exceeded by at least 3%, comparing forms of the curves from the pyrosensors by means of a Pearson correlation coefficient, if a similarity extent between the forms of the signals is lower than a reference value, dividing the signals into at least 8 spectral components in a form of sinusoidal functions and comparing them between each other and to the reference values by:

establishing a similarity percentage between each spectral component of each signal and the reference ones by determining a common fraction of area of two spectral distributions, wherein one distribution is a preset reference one, while another one is received from the signal; comparing the determined similarity percentage to the threshold;

determining a similarity percentage between each spectral component of the signals by determining a common fraction of area of two spectral distributions, wherein one distribution belongs to the signal from one pyrosensor, while another one is received from the signal of another pyrosensor; comparing the determined similarity percentage to the thresholds, if the similarity percentage is at least 25%, forming an object motion detection signal.

According to one of preferable embodiments of the method, the measurement period is between 50 and 150 ms from each pyrosensor.

According to another preferable embodiment of the method, the signal change rate function is built at the number of measurements of 64.

It should be appreciated that the foregoing general description and further detailed description are solely illustrative and explanatory, and do not limit the claimed invention.

BRIEF DESCRIPTION OF THE DRAWINGS

The provided drawings, which are included into the present description of the invention and constitute its part, illustrate embodiments of the invention and serve to explain the invention principles along with the description.

DETAILED DESCRIPTION

An illustrative embodiment of the invention is described hereinafter in detail using said figures. Implementations, which are disclosed in the following description of the embodiment, do not encompass all implementations of the invention, rather they serve solely to provide an additional explanation of the essence thereof.

To carry out the claimed method, a motion detection system may be used, the system comprising a sensor and a receiver with a data exchange occurring between them. The sensor may comprise two or more pyrosensors which generate signals constantly. Said pyrosensors are arranged one on top of another, thereby forming sensitivity areas.

The sensor comprises a signals analysis unit and a data unit. The signal analysis unit comprises three successive subunits: a delta analysis subunit, a correlation analysis subunit, and a signals spectral analysis subunit.

The data unit comprises a reference values unit and a thresholds unit. Said units are equipped with a data array with values of the most types of the objects which may represent probable interferences for the operation of the security systems. Said values were received as a result of long-term experimental studies. These units enable selecting a type of the motion detection object. In the most cases, of course, it is a human.

The method for detecting the object motion is carried out in the following way.

Figure 1:
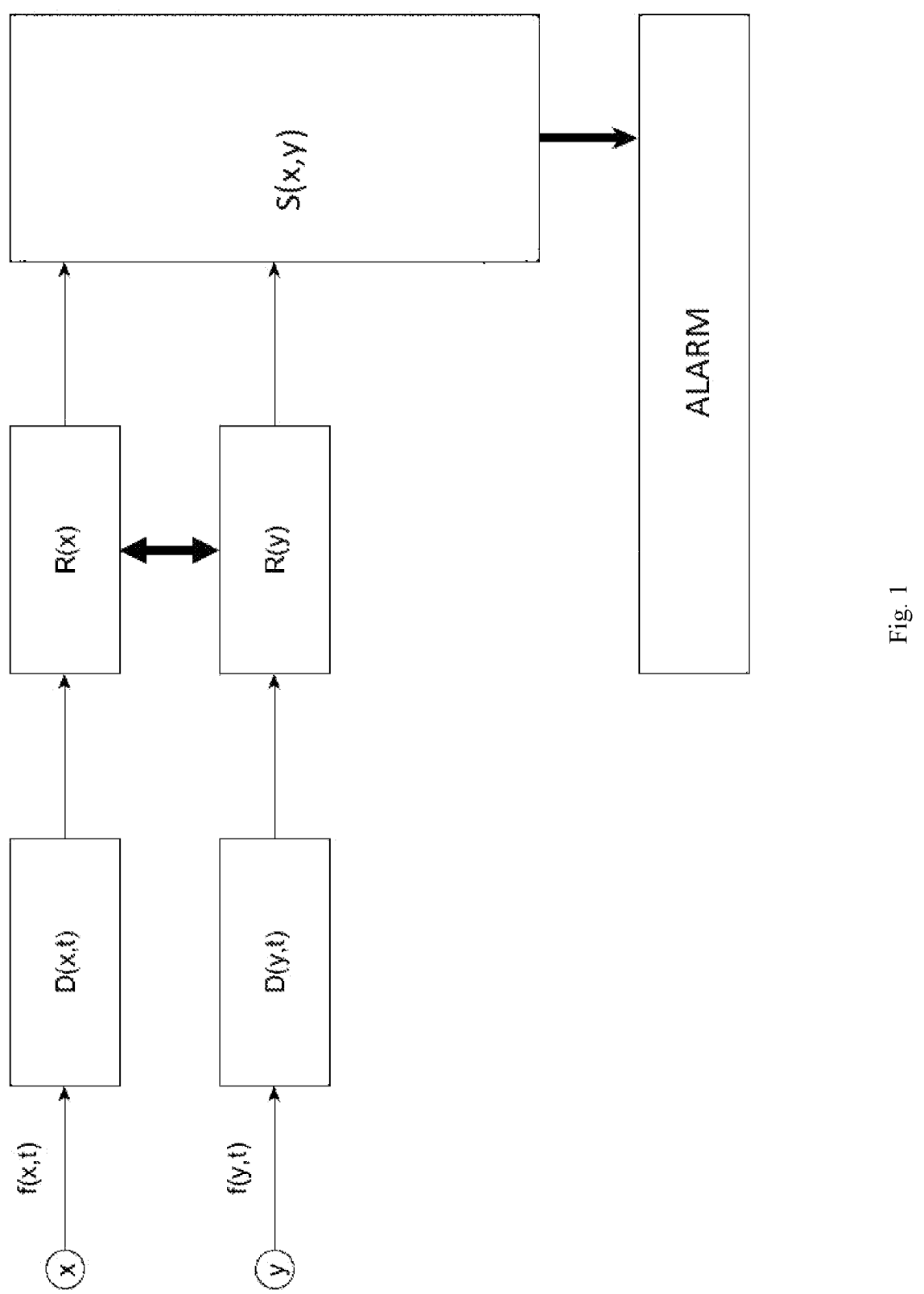
FIG. 1 is a simplified diagram that demonstrates the method operation, when using two pyrosensors.

Two pyrosensors (x, y) were used for the example (see FIG. 1). Said pyrosensors, within the sensitivity areas, detect a presence of any motion, at the same time generating the signals f(x,t), f(y,t) respectively. A purpose of this example is to detect that this motion belongs to a human, however, the method enables to detect any preset motion.

Then, by means of the delta analysis subunit, the intensity of the signal is measured by determining the change rate of the signal within the measurement period of 50-150 ms (6-20 Hz) from each pyrosensor, namely, a function D(x,t), D(y,t) of the signal change rate is built at the number of measurements of 64 for said measurement period. Therefore, the signals f(x,t), f(y,t) are discretized with the period of 50-150 ms (6-20 Hz)→fd(x,t), fd(y,t) and the signal derivative is calculated that corresponds to the increase rate fd'(x,t), fd'(y,t), respectively, that is a delta function D(x,t), D(y,t).

Then, the measurement data of the derived function curve is compared to the thresholds from the thresholds unit. If the thresholds are exceeded by 3-5%, it will be established that the signal fd(x,t), fd(y,t) is probably from the human, thus, this signal goes to the processing by the correlation analysis subunit.

By means of the correlation analysis subunit, shapes of the formed curves from the pyrosensors are compared by means of the Pearson correlation coefficient R(x), R(y), thereby determining the similarity of the signals.

The Pearson correlation coefficient is calculated according to the formula:

$$r_{xy} = \frac{\sum_{i=1}^{m}(x_i - \overline{x})(y_i - \overline{y})}{\sqrt{\sum_{i=1}^{m}(x_i - \overline{x})^2 \sum_{i=1}^{m}(y_i - \overline{y})^2}} = \frac{\text{cov}(x, y)}{\sqrt{s_x^2 s_y^2}},$$

where $\overline{x}, \overline{y}$—sample mean values $x^m | y^m, s_x^2, s_y^2$—sample variances, $r_{xy} \in [-1, 1]$.

If the similarity extent between the forms of the signals is lower than the reference value taken from the reference values unit, it will be established that the signals fd(x,t), fd(y,t), and R(x), R(y) probably belong to the human, and then they come to the signals spectral analysis unit for the processing.

This particular last signal verification step provides the accurate and error-free confirmation that the signal belongs/ does not belong to the human.

The signals fd(x,t), fd(y,t) are divided into 8 spectral components in the form of sinusoidal functions and they are compared between each other and to the reference values from the reference values unit. There may be more spectral components depending on the type of the object and environmental conditions.

The comparison of the spectral components between each other and to the reference values may be carried out in various ways, however, the following are mandatory.

Establishing a similarity percentage between each spectral component of each signal and the reference ones from the reference values unit by determining a common fraction of area of two spectral distributions, wherein one distribution is a preset reference one, while another one is received from the signal.

The determined similarity percentage is compared to the threshold from the thresholds unit.

The calculation of the threshold S is a function S'=W(a, b,c,d), where W is a function of dependence on the corresponding arguments, a=D(x,t), b=R(x), c=D(y,t), d=R(y)

Therefore, the threshold depends on the increase rate of the signals and on the correlation coefficient.

Also, the similarity percentage between each spectral component of the signals is determined by determining a common fraction of area of two spectral distributions, wherein one distribution belongs to the signal from one pyrosensor, while another one is received from the signal of another pyrosensor.

The determined similarity percentage is compared to the thresholds from the thresholds unit.

The calculation of the threshold S is a function S'=W(a, b,c,d), where W is a function of dependence on the corresponding arguments, a=D(x,t), b=R(x), c=D(y,t), d=R(y)

Therefore, the threshold depends on the increase rate of the signals and on the correlation coefficient.

If the similarity percentage from said steps is 25%, the motion detection signal that belongs to the human will be formed, then the signal will be transmitted to the receiver.

Figure 2:
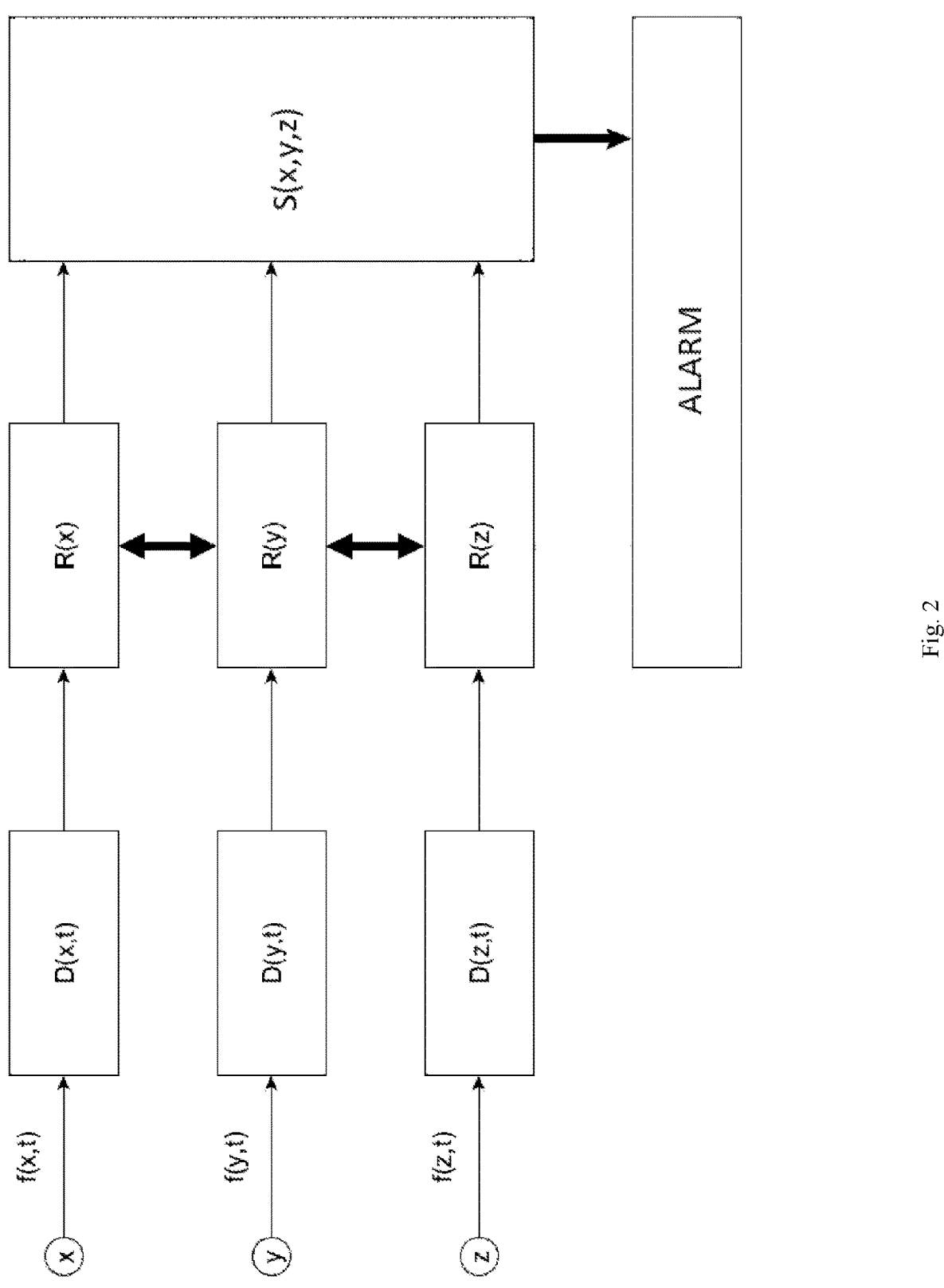
FIG. 2 is a simplified diagram that demonstrates the method operation, when using three pyrosensors.
Figure 3:
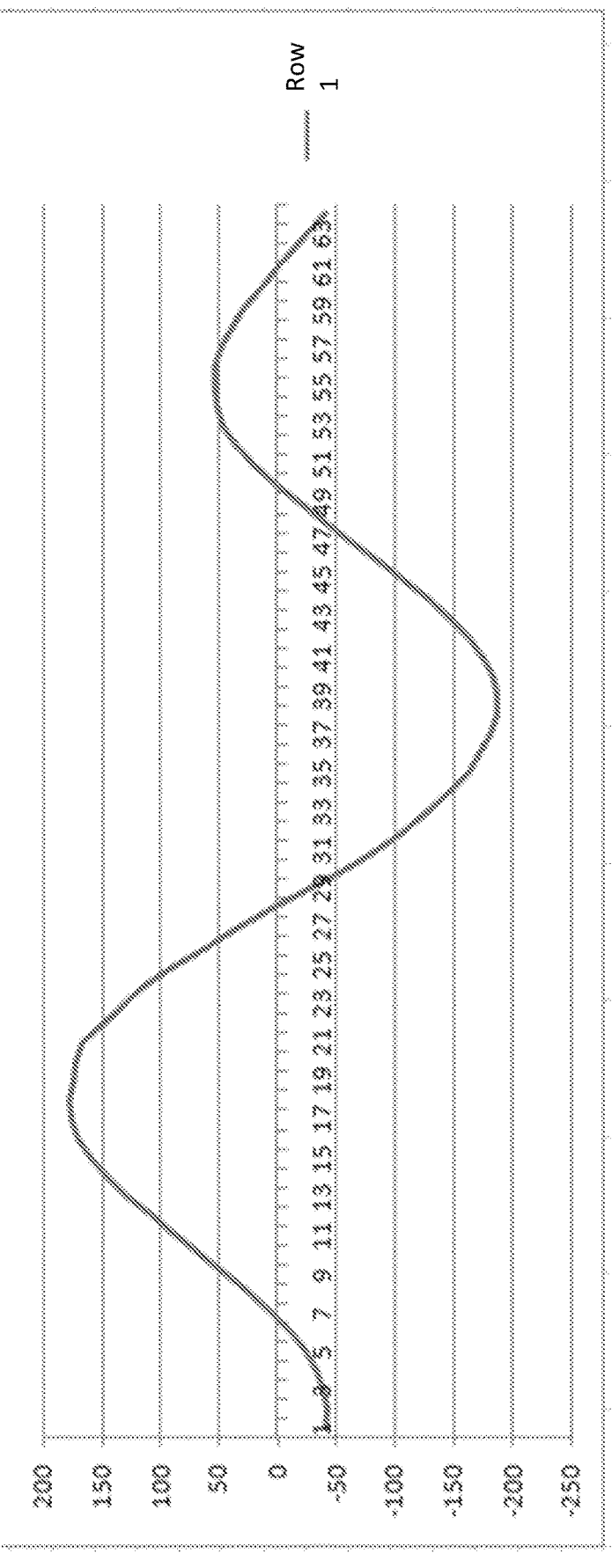
FIG. 3 is a diagram that shows an input signal f(x,t) (when using two pyrosensors).
Figure 4:
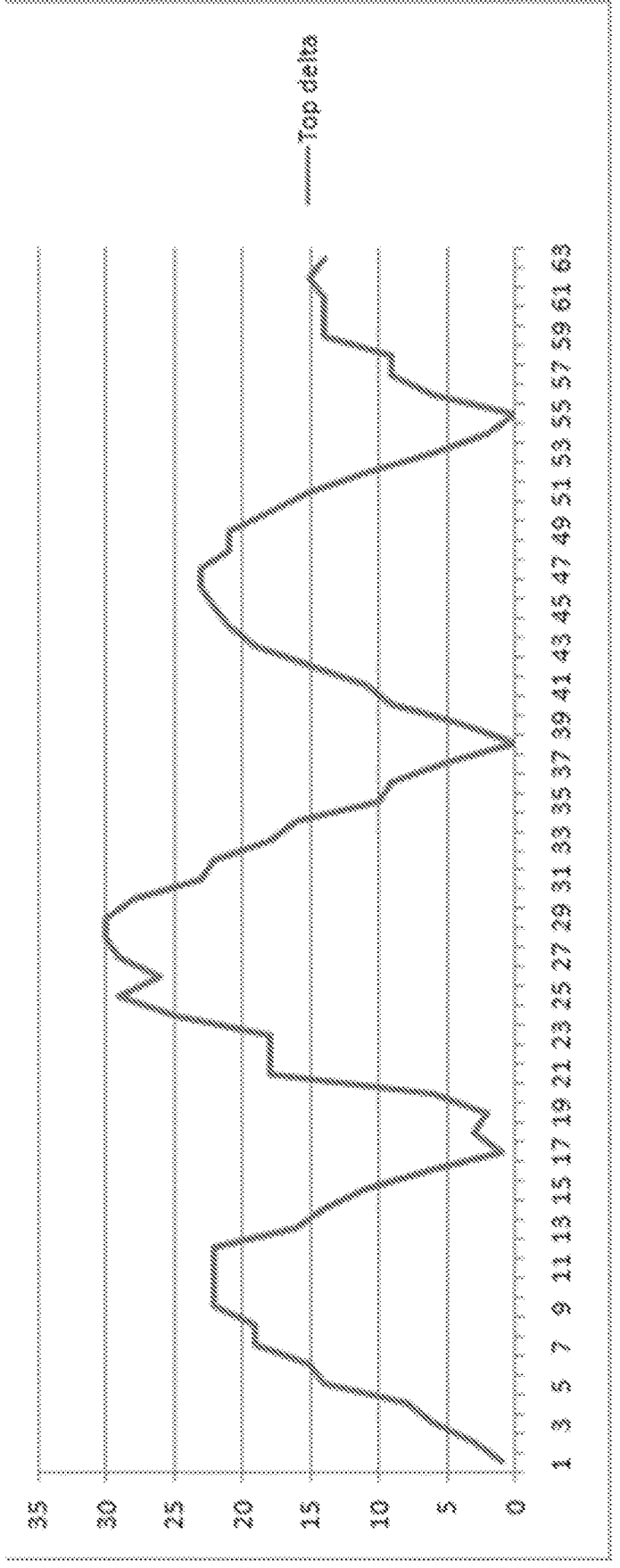
FIG. 4 is a diagram that shows the signal derivative that corresponds to the increase rate fd'(x,t) (when using two pyrosensors).
Figure 5:
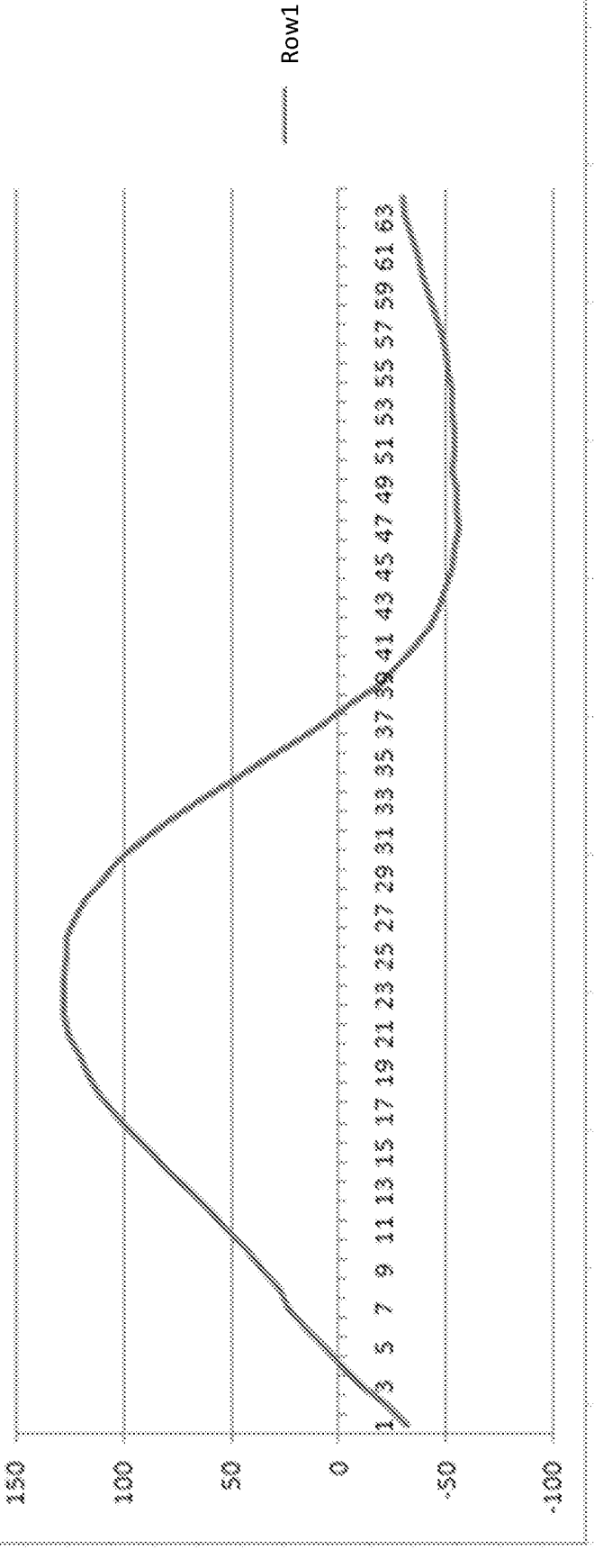
FIG. 5 is a diagram that shows an input signal f(y,t) (when using two pyrosensors).
Figure 6:
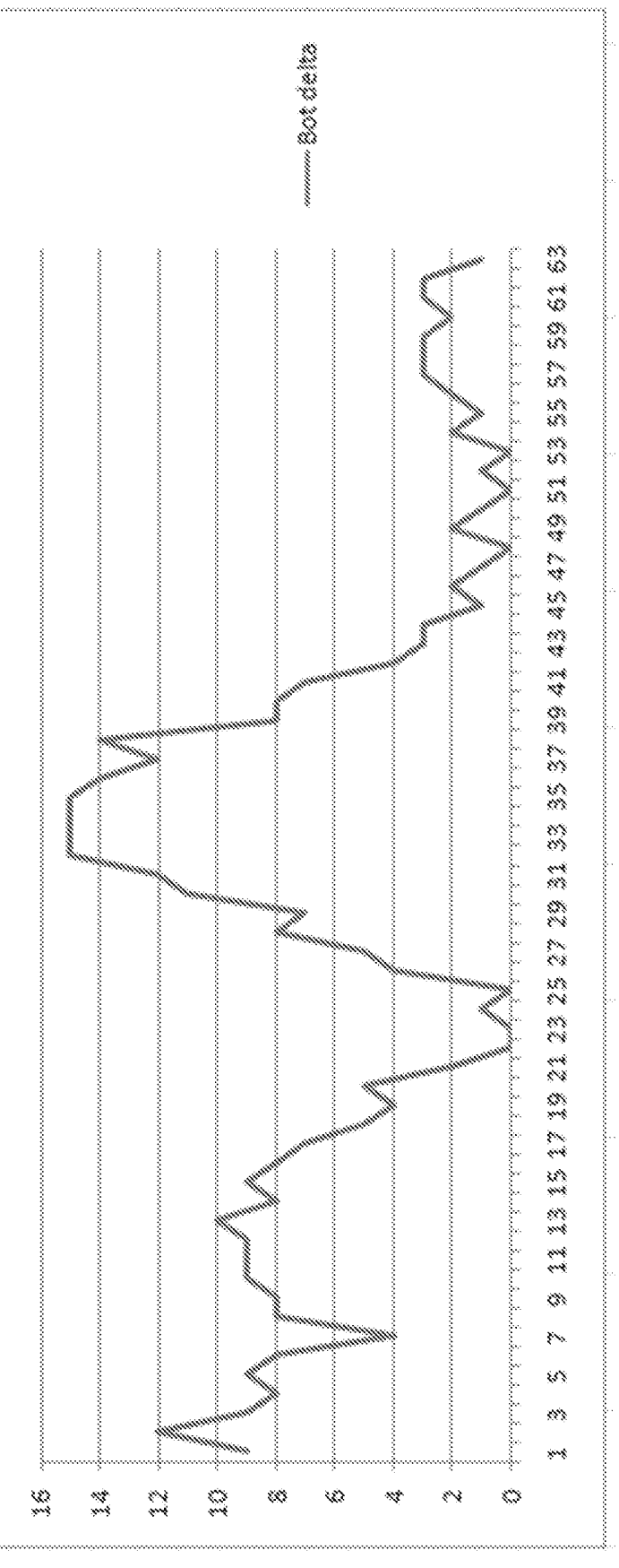
FIG. 6 is a diagram that shows the signal derivative that corresponds to the increase rate fd'(y,t) (when using two pyrosensors).
Figure 7:
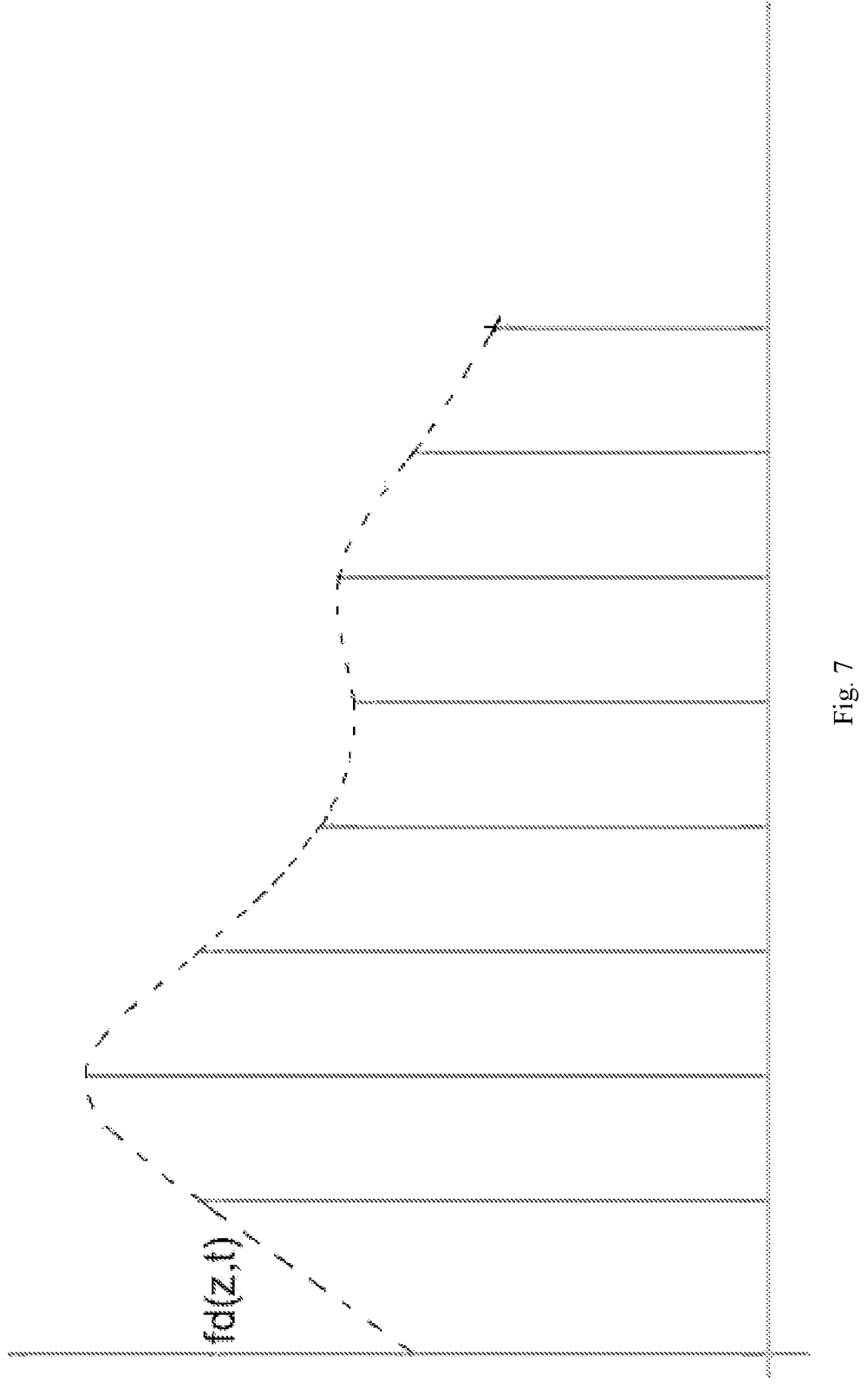
FIGS. 7-9 schematically show the distribution of the signals of the three pyrosensors fd(x,t), fd(y,t), fd(z,t) respectively into 8 spectral components in the form of sinusoidal functions.
Figure 8:
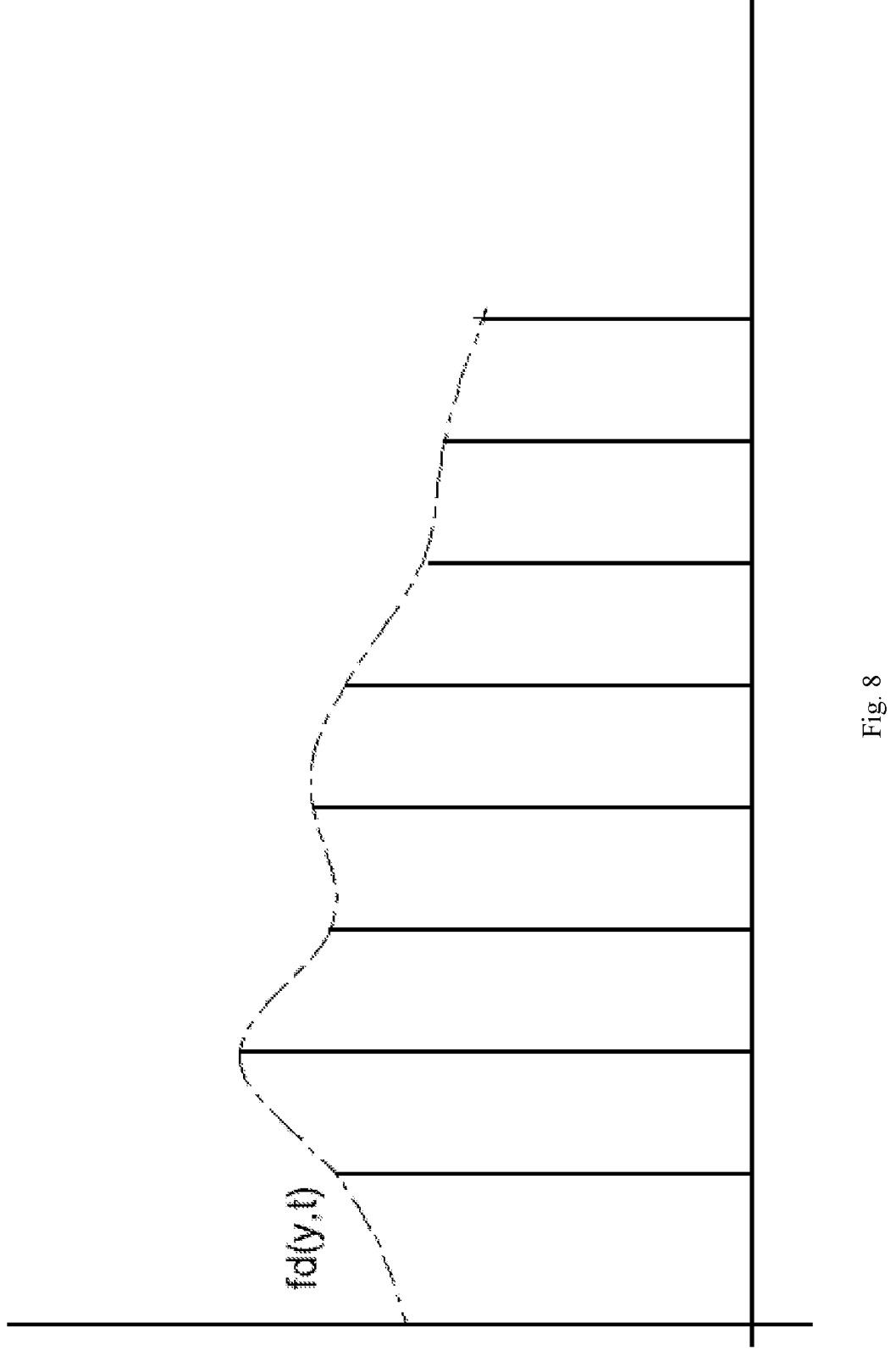
Figure 9:
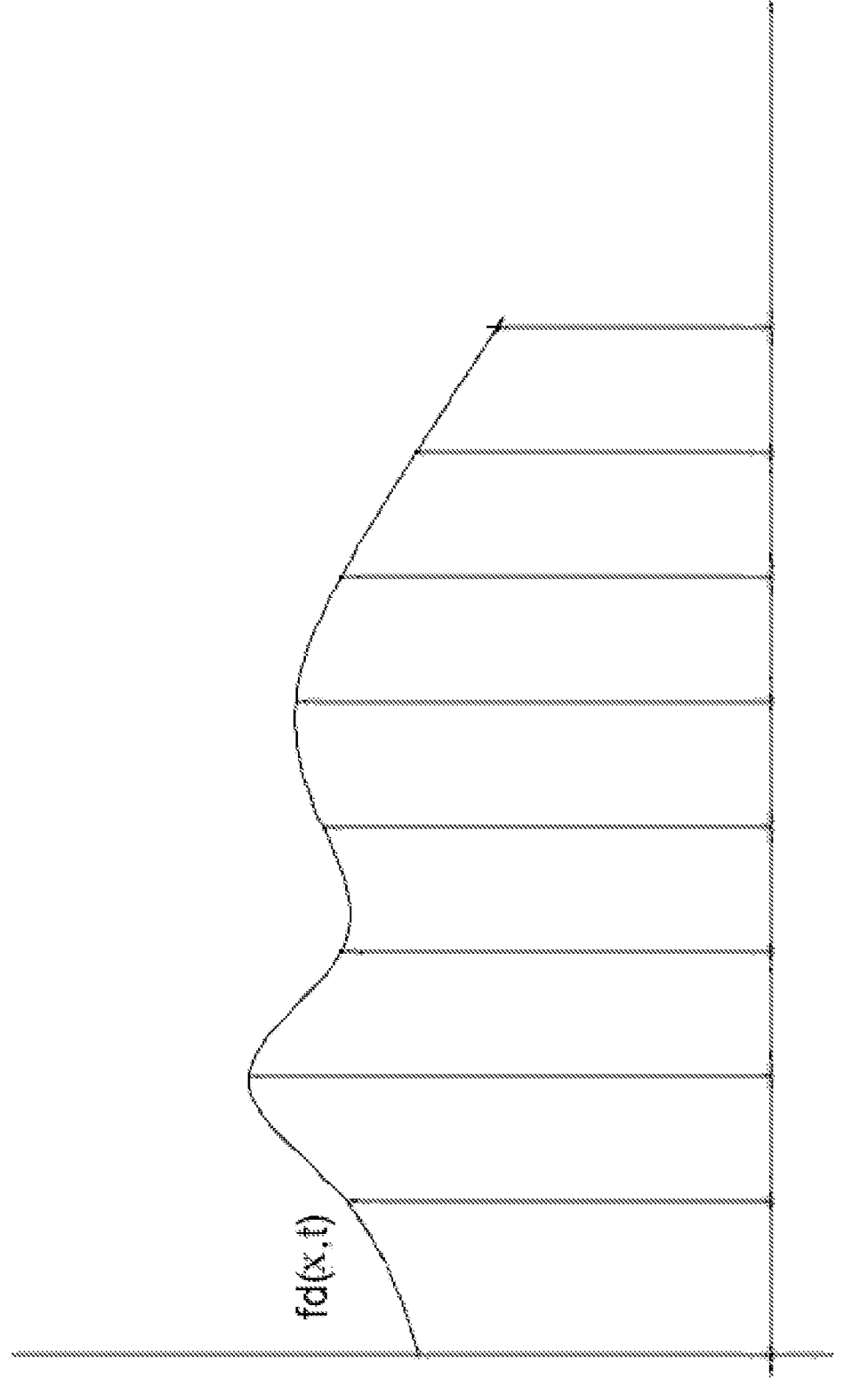
Figure 10:
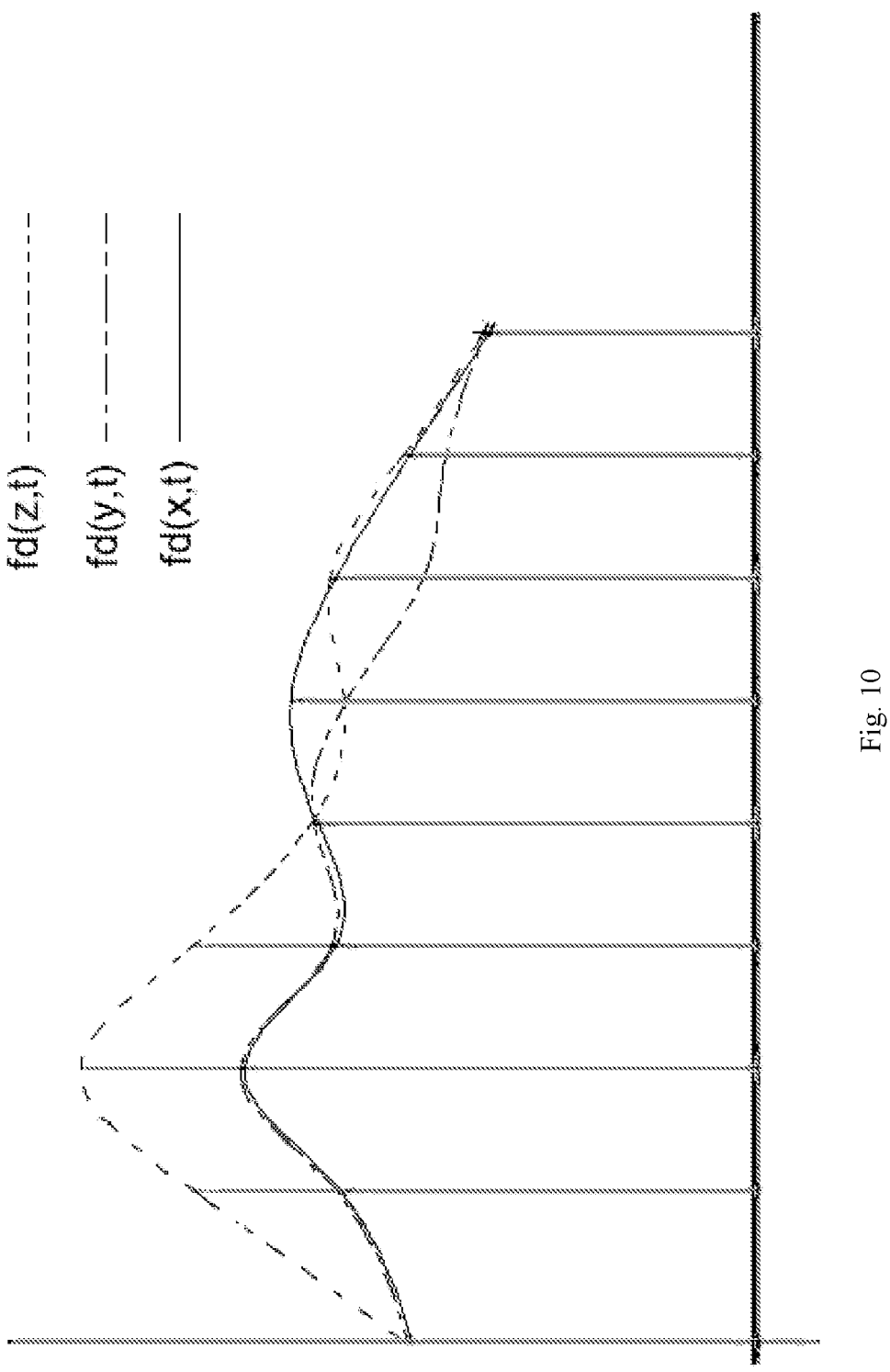
FIG. 10 schematically shows the comparison between the spectral components from the three pyrosensors.

Three pyrosensors (x, y, z) were used for the example (see FIG. 2). Said pyrosensors, within the sensitivity areas, detect a presence of any motion, at the same time generating the signals f(x,t), f(y,t), f(z,t) respectively. A purpose of this example is to detect that this motion belongs to a human, however, the method enables to detect any preset motion.

Then, by means of the delta analysis subunit, the intensity of the signal is measured by determining the change rate of the signal within the measurement period of 50-150 ms (6-20 Hz) from each pyrosensor, namely, a function D(x,t), D(y,t), D(z,t) of the signal change rate is built at the number of measurements of 64 for said measurement period. Therefore, the signals f(x,t), f(y,t), f(z,t) are discretized with the period of 50-150 ms (6-20 Hz)→f(x,t), f(y,t), f(z,t) and the signal derivative is calculated that corresponds to the increase rate fd'(x,t), fd'(y,t), fd'(z,t), respectively, that is a delta function D(x,t), D(y,t), D(z,t).

Then, the measurement data of the derived function curve is compared to the thresholds from the thresholds unit. If the thresholds are exceeded by 3-5%, it will be established that the signal fd(x,t), fd(y,t), fd(z,t) is probably from the human, thus, this signal goes to the processing by the correlation analysis subunit.

By means of the correlation analysis subunit, shapes of the formed curves from the pyrosensors are compared by means of the Pearson correlation coefficient R(x), R(y), R(z), thereby determining the similarity of the signals.

The Pearson correlation coefficient is calculated according to the formula:

$$r_{xy} = \frac{\sum_{i=1}^{m}(x_i - \overline{x})(y_i - \overline{y})}{\sqrt{\sum_{i=1}^{m}(x_i - \overline{x})^2 \sum_{i=1}^{m}(y_i - \overline{y})^2}} = \frac{\text{cov}(x, y)}{\sqrt{s_x^2 s_y^2}},$$

where $\overline{x}, \overline{y}$—sample mean values $x^m | y^m, s_x^2, s_y^2$—sample variances, $r_{xy} \in [-1, 1]$.

If the similarity extent between the forms of the signals is lower than the reference value taken from the reference values unit, it will be established that the signals fd(x,t), fd(y,t), fd(z,t), and R(x), R(y), R(z) probably belong to the human, and then they come to the signals spectral analysis unit for the processing.

This particular last signal verification step provides the accurate and error-free confirmation that the signal belongs/ does not belong to the human.

The signals fd(x,t), fd(y,t), fd(z,t) are divided into 8 spectral components in the form of sinusoidal functions and they are compared between each other and to the reference values from the reference values unit. There may be more spectral components depending on the type of the object and environmental conditions.

The comparison of the spectral components between each other and to the reference values may be carried out in various ways, however, the following are mandatory.

Establishing a similarity percentage between each spectral component of each signal and the reference ones from the reference values unit by determining a common fraction of area of two spectral distributions, wherein one distribution is a preset reference one, while another one is received from the signal.

The determined similarity percentage is compared to the threshold from the thresholds unit.

The calculation of the threshold S is a function S'=W(a, b,c,d,e,g), where W is a function of dependence on the corresponding arguments, a=D(x,t), b=R(x), c=D(y,t), d=R(y), e=D(z,t), g=R(z)

Therefore, the threshold depends on the increase rate of the signals and on the correlation coefficient.

Also, the similarity percentage between each spectral component of the signals is determined by determining a common fraction of area of two spectral distributions, wherein one distribution belongs to the signal from one pyrosensor, while another one is received from the signal of another pyrosensor.

The determined similarity percentage is compared to the thresholds from the thresholds unit.

The calculation of the threshold S is a function S'=W(a, b,c,d,e,g), where W is a function of dependence on the corresponding arguments, a=D (x,t), b=R(x), c=D (y,t), d=R(y), c=D(z,t), g=R(z)

Therefore, the threshold depends on the increase rate of the signals and on the correlation coefficient.

If the similarity percentage from said steps is 25%, the motion detection signal that belongs to the human will be formed, then the signal will be transmitted to the receiver.

The invention claimed is:

1. A method for detecting an object motion, the method comprising:

detecting a motion within sensitivity areas of at least two pyrosensors and generating a signal from the at least two pyrosensors, wherein the at least two pyrosensors are arranged one on top of another, then, measuring an intensity of the signal by determining a change rate of the signal within a measurement period of 150 ms at most from each pyrosensor of the at least two pyrosensors, particularly, building a function of the signal change rate at a number of measurements of at least 32 for said measurement period, comparing the measurement data of a derived function curve to thresholds, if the thresholds are exceeded by at least 3%, comparing forms of the curves from the at least two pyrosensors by means of a Pearson correlation coefficient, if a similarity extent between the forms of the signals is lower than a reference value, dividing the signals into at least 8 spectral components in a form of sinusoidal functions and comparing them between each other and to the reference values by:

establishing a similarity percentage between each spectral component of each signal and the reference ones by determining a common fraction of area of two spectral distributions, wherein one distribution is a preset reference one, while another one is received from the signal; comparing the determined similarity percentage to the threshold;

determining a similarity percentage between each spectral component of the signals by determining a common fraction of area of two spectral distributions, wherein one distribution belongs to the signal from one pyrosensor of the at least two pyrosensors, while another one is received from the signal of another pyrosensor of the at least two pyrosensors; comparing the determined similarity percentage to the thresholds, and if the similarity percentage is at least 25%, forming an object motion detection signal.

2. The method for detecting the object motion of claim 1, wherein the measurement period is between 50 and 150 ms from each pyrosensor of the at least two pyrosensors.

3. The method for detecting the object motion of claim 1, wherein the signal change rate function is built at the number of measurements of 64.

* * * * *